United States Patent
Cunningham

(10) Patent No.: US 6,202,524 B1
(45) Date of Patent: Mar. 20, 2001

(54) GLASS WORKPIECE LOCATING SYSTEM

(75) Inventor: Dennis J. Cunningham, Zelienople, PA (US)

(73) Assignee: Billco Manufacturing, Inc., Zelienople, PA (US)

( * ) Notice: Subject to any disclaimer, the term of this patent is extended or adjusted under 35 U.S.C. 154(b) by 0 days.

(21) Appl. No.: 08/718,875

(22) Filed: Sep. 24, 1996

(51) Int. Cl.$^7$ .................. B24B 49/00; B24B 51/00; B26D 1/00; B26D 5/00

(52) U.S. Cl. .................. 83/13; 83/56; 83/73; 83/75.5; 83/76.8; 83/289; 83/370; 83/421; 83/391; 451/41; 451/44; 451/5; 451/11

(58) Field of Search .................. 83/418–421, 437, 83/435.2, 370, 879–880, 13, 56, 73, 365, 368, 391; 451/5, 6, 11, 41, 44, 336, 412

(56) References Cited

U.S. PATENT DOCUMENTS

| | | | |
|---|---|---|---|
| 3,151,794 | 10/1964 | Brand | 225/96.5 |
| 3,424,357 | 1/1969 | Curtze et al. | 225/2 |
| 3,577,829 | * 5/1971 | Rowley et al. | 83/419 |
| 3,600,992 | * 8/1971 | Dryon | 83/421 |
| 3,668,955 | 6/1972 | Rupprecht et al. | 83/6 |
| 3,718,061 | * 2/1973 | Wilkin | 83/419 |
| 3,742,794 | 7/1973 | Rupprecht et al. | 83/12 |
| 3,923,157 | * 12/1975 | Cavenar | 83/419 |
| 4,011,779 | * 3/1977 | Berg | 83/365 |
| 4,111,412 | * 9/1978 | Cathers | 83/421 |
| 4,171,657 | * 10/1979 | Halberschmidt et al. | 83/886 |
| 4,185,672 | 1/1980 | Vit et al. | 144/312 |
| 4,210,052 | 7/1980 | Fisher | 83/881 |
| 4,235,139 | * 11/1980 | Haenni et al. | 83/419 |
| 4,358,978 | * 11/1982 | Lwason | 83/365 |
| 4,608,783 | * 9/1986 | Bavelloni | 451/281 |
| 4,667,555 | * 5/1987 | Lisec | 83/879 |
| 4,920,495 | 4/1990 | Pilkington | 364/474.37 |
| 5,005,318 | 4/1991 | Shafir | 451/41 |
| 5,079,981 | 1/1992 | Singer et al. | 83/72 |
| 5,083,487 | * 1/1992 | Croteau | 83/370 |
| 5,172,618 | * 12/1992 | Moriya et al. | 83/13 |
| 5,188,013 | 2/1993 | Cardinale | 83/879 |
| 5,398,579 | * 3/1995 | Bando | 83/879 |
| 5,544,558 | 8/1996 | Hughes | 83/75.5 |
| 5,586,479 | * 12/1996 | Roy et al. | 83/419 |

FOREIGN PATENT DOCUMENTS

| | | | |
|---|---|---|---|
| 4212867 | * 10/1993 | (DE) | 83/365 |
| 1120171 | * 7/1956 | (FR) | 83/365 |
| 30313 | * 2/1986 | (JP) | 83/365 |

* cited by examiner

*Primary Examiner*—M. Rachuba
(74) *Attorney, Agent, or Firm*—Webb, Ziesenheim Logsdon Orkin & Hanson, P.C.

(57) ABSTRACT

A rectangular glass workpiece positioning system and method of use for a cutting table is disclosed. A conveyor transports a rectangular glass workpiece in a transporting direction. A stop mechanism is adapted to abut an edge of the glass workpiece which is positioned substantially perpendicular to the transporting direction of the conveyor. A movable edge sensor is adapted to sense an edge of the glass workpiece extending substantially parallel to the transporting direction with the movable edge sensor movable at least perpendicular to the transporting direction. A movable cutting head is provided for cutting the glass workpiece according to a predetermined pattern. The present invention additionally includes a method of retrofitting existing cutting tables.

14 Claims, 2 Drawing Sheets

GLASS WORKPIECE LOCATING SYSTEM

BACKGROUND OF THE INVENTION

1. Field of the Invention

The present invention relates to a glass workpiece locating system and method for locating a rectangular glass workpiece on a cutting table. The present invention further relates to a method of retrofitting existing cutting tables with the positioning system of the present invention.

2. Prior Art

FIG. 1 illustrates a conventional cutting table 10 which is utilized for locating, squaring and cutting a rectangular glass workpiece having known dimensions. The conventional method of locating and squaring a rectangular workpiece on the cutting table 10 is to transport the workpiece in a transporting direction 12 by conveyors 14. The workpiece is conveyed in the transporting direction 12 until the workpiece abuts a first pair of stops 16. Upon contact between the workpiece and the first pair of stops 16, the conveyors 14 are stopped, and the workpiece is transported subsequently transversely to the transporting direction 12 against a second pair of stops or locators 18. The transportation transverse to the transporting direction 12 is carried out by a retractable conveyor 20 operating transverse to the conveyors 14. With the rectangular workpiece abutting against both the first pair of stops 16 and the second pair of stops 18, the workpiece has now been squared, and the cutting head assembly 22 can begin cutting the workpiece according to a predetermined pattern.

U.S. Pat. No. 3,424,357 to Curtze et al. discloses an automatic sizing and severing apparatus for rectangular glass workpieces similar to the prior art illustrated in FIG. 1. The Curtze et al. patent discloses an apparatus utilizing an air support table which is sloped from the horizontal. A glass workpiece is transported onto the table by conveyor rolls and then is subsequently allowed to float to a squared-up position by the air table. The work may also be driven into the squaring index by rolls positioned transverse to the conveying rolls. After the glass workpiece is appropriately squared, it can be severed by an automatic scoring mechanism which is controlled by a series of edge-sensing sensors. A photocell or sensor is mounted on the positioning bridge of the cutting head to sense the trailing edge of the glass workpiece while another sensing device is mounted within the air support table to detect the leading edge of the glass workpiece. The sensors cooperate to determine the relevant position of the glass workpiece to control the severing apparatus.

The prior art cutting tables disclosed in FIG. 1 and in the Curtze et al. patent require a complicated set of conveyors operating transverse to each other, at least one of which being retractable. Additionally, the transverse movement of the glass workpiece in these prior art systems increases the likelihood of damage to the specific workpiece.

Another known glass workpiece positioning system for a cutting table utilizes an edge sensor for determining the precise location of the workpiece. A conveyor will transport a workpiece onto the cutting table and stop, positioning the glass workpiece in an arbitrary location on the cutting table. An edge-detecting sensor will move across the cutting table until it has detected at least three edges of the workpiece sufficient so that the precise orientation of the glass workpiece can be determined. The movement of the cutting head assembly is adjusted according to the specific positioning of the glass workpiece. In this prior art system, the adjustment generally requires a rotation of the coordinate system to correspond to the orientation of the glass workpiece. This system represents a time-consuming and complex positioning system.

SUMMARY OF THE INVENTION

It is an object of the present invention to overcome the aforementioned drawbacks of the prior art. It is a further object of the present invention to provide a simple, efficient glass workpiece locating system which can be easily retrofitted into existing cutting tables. The objects of the present invention are achieved by providing a glass workpiece positioning system which includes a conveyor mechanism, a stop mechanism and a movable side edge sensor. The conveyor mechanism receives, transports and supports a rectangular glass workpiece thereon in a transporting direction. The stop mechanism is adapted to abut a front edge of the rectangular glass workpiece which is positioned substantially perpendicular to the transporting direction of the conveyor, wherein the conveyor transports the rectangular glass workpiece in the transporting direction until the rectangular glass workpiece engages the stop mechanism. The movable side edge sensor is adapted to sense an edge of the rectangular glass workpiece extending substantially parallel to the transporting direction, wherein the edge sensor is movable at least perpendicular to the transporting direction.

In one embodiment of the present invention, the movable side edge sensor is mounted on a movable cutting head assembly of the cutting table, wherein the cutting head assembly includes a cutting head for cutting the glass workpiece according to a predetermined pattern.

The present invention may additionally include a plurality of retractable stops positioned in a line perpendicular to the transporting direction to form the stop mechanism. The conveyor mechanism may include a plurality of substantially parallel conveyor belts adapted to receive and transport the glass workpiece in the transporting direction which is substantially parallel to the conveyor belts. Additionally, the side edge sensor of the present invention may be formed as a photocell.

The present invention includes a method of positioning a rectangular glass workpiece on a cutting table including the steps of:

a) receiving and transporting a rectangular glass workpiece in a transporting direction;

b) abutting a first edge of the glass workpiece which is positioned substantially perpendicular to the transporting direction;

c) moving an edge sensor substantially perpendicular to the transporting direction; and d) sensing an edge of the glass workpiece which is substantially parallel with the transporting direction with the movable edge sensor.

The present invention additionally includes a method of retrofitting a rectangular glass workpiece positioning system onto an existing glass workpiece cutting table having at least a conveyor mechanism for receiving and moving the glass workpiece in a transporting direction and a movable cutting head assembly which includes a cutting head for cutting the glass workpiece according to a predetermined pattern. The method of retrofitting according to the present invention includes the steps of: first, disabling any supplemental conveyor rolls operating transverse to the transporting direction; second, a stop mechanism is provided to abut a first edge of the glass workpiece which is substantially perpendicular to the transporting direction; and third, an edge sensor is attached to the cutting head assembly, wherein the edge sensor is adapted to sense an edge of the rectangular glass workpiece which is substantially parallel with the transporting direction.

These and other advantages of the present invention will be clarified in the brief description of the preferred embodiment taken together with the attached figures wherein like reference numerals represent like elements throughout.

BRIEF DESCRIPTION OF THE PREFERRED EMBODIMENT

Figure 2:
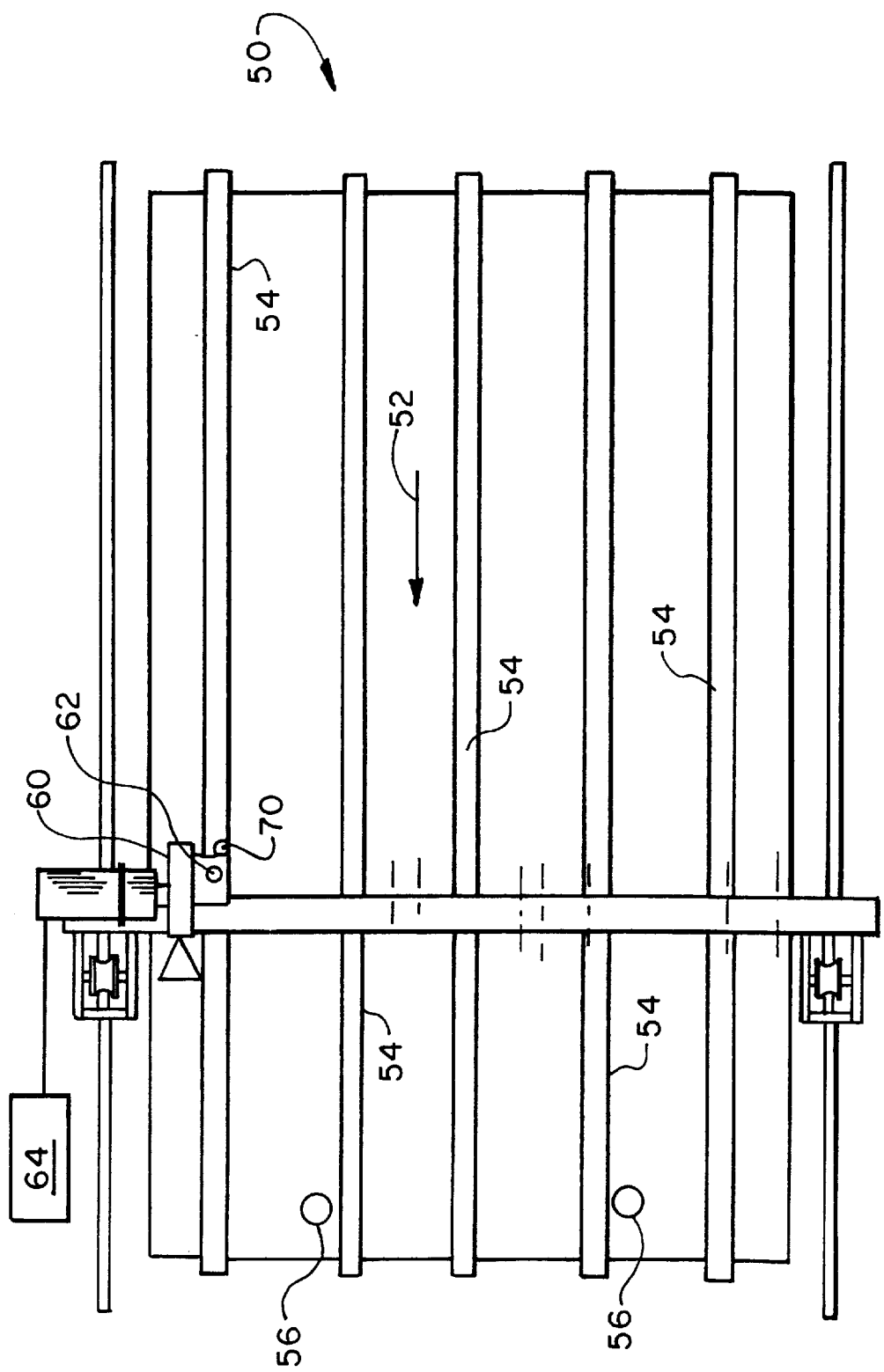
FIG. 2 is a schematic plan view of a rectangular workpiece positioning system and cutting table according to the present invention.

A glass workpiece positioning system according to the present invention is illustrated in the glass workpiece cutting table 50 shown in FIG. 2. The cutting table 50 includes a conveyor for receiving, transporting and supporting a rectangular glass workpiece in a transporting direction 52. The conveyor is formed by a plurality of substantially parallel conveyor belts 54 which are adapted to receive and transport a rectangular glass workpiece in the transporting direction 52 which is substantially parallel to the conveyor belts 54. Additionally, the conveyor belts 54 may be conventionally driven by a common drive. Stop mechanism 56 is formed by a pair of pneumatically actuated, retractable stop members which are positioned at one end of the cutting table 50 and are aligned substantially perpendicular to the transporting direction 52 and substantially perpendicular to the conveyor belts 54.

A cutting head assembly 60 is provided for movement over the cutting table 50 in a conventional fashion. For example, the cutting head assembly 60 can be supported on an X-Y-Z positioning system as is known in the art. The cutting head assembly 60 includes a glass scoring or cutting head 62 mountable thereon for cutting the glass workpiece according to a predetermined pattern. The cutting head assembly 60 and cutting head 62 will be controlled by a controller 64.

An edge sensor 70 is mounted on the cutting head assembly 60 to be movable therewith. The edge sensor 70 can be formed as a photosensor or the like as is known in the art. The sensor 70 can be any type of sensor sufficient for detecting the edge of a glass workpiece positioned beneath the sensor 70.

The cutting table 50 in the glass workpiece positioning system of the present invention operates as follows. A rectangular glass workpiece is received from upstream processing in the transporting direction 52 on the conveyor belts 54. The conveyor belts 54 will transport the rectangular glass workpiece in the transporting direction 52 until a front edge of the rectangular glass workpiece abuts the stop mechanism 56. With the front edge of the glass workpiece abutting against the stop mechanism 56, the rectangular glass workpiece will have the proper orientation on the cutting table 50 relative to the cutting head assembly 60 and the predetermined control of the cutting head 62. Without this alignment, the relative axes utilized by the controller 64 to control the cutting head 62 would have to ultimately be rotated to match the orientation of the glass workpiece. The pair of stop members of the stop mechanism 56 could also be replaced with a single stop member provided that the stop member is sufficiently long to align the first edge of the rectangular glass workpiece substantially perpendicular to the transporting direction 52 in substantially the same manner as the pair of stop members.

After the first edge of the rectangular workpiece is abutting both stop members of stop mechanism 56, the conveyor belts 54 are stopped. Sensors may be provided in the stop members for automating this process.

Following the alignment of the glass workpiece by the stop mechanism 56 and the stopping of the conveyor belts 54, the edge sensor 70 is moved substantially perpendicular to the transporting direction 52 by appropriate movement of the cutting head assembly 60 until the edge sensor 70 senses a side edge of the glass workpiece which is substantially parallel to the transporting direction. The sensing of the side edge of the glass workpiece, which is substantially parallel to the transporting direction 52, is sufficient for the controller 64 to know precisely where the rectangular glass workpiece is located on the cutting table 50. Specifically, the distance between the starting position of the cutting head assembly 60 on the side of the cutting table 50 and the position where the edge sensor 70 senses the side edge of the glass workpiece is known by the controller 64 and can be utilized to adjust the automated cutting program for controlling of the cutting head 62. This adjustment does not require the rotation of the control axes. The adjustment merely includes the adding of an offset distance in one of the axial directions, preferably, the axis which is perpendicular to the transporting direction 52. With the specific position of the glass workpiece known and after the controller adjusts for the appropriate offset, the cutting head 62 will cut the glass workpiece according to the predetermined pattern.

It will be appreciated that the present invention is intended primarily for use where rectangular glass workpieces of known dimensions are being forwarded to the cutting table 50. However, the operation of the cutting table 50 can be appropriately modified to accommodate rectangular workpieces of varying configurations. For example, the edge sensor 70 can be utilized for determining both side edges of a rectangular glass workpiece which are parallel with the transporting direction 52 as well as a back edge of the glass workpiece which is perpendicular to the transporting direction 52 and parallel to the front edge of the glass workpiece abutting the stop mechanism 56.

Figure 1:
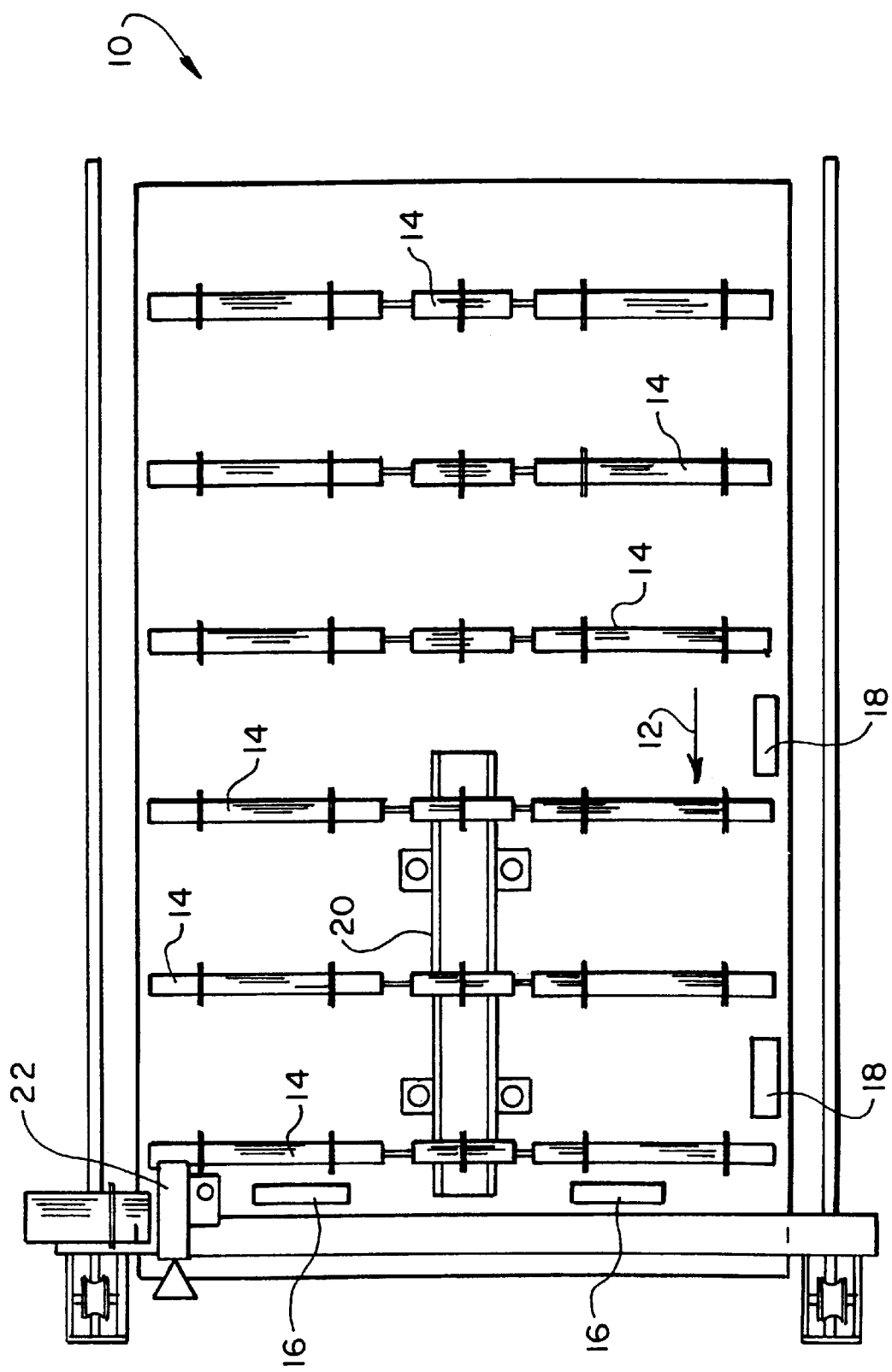
FIG. 1 is a schematic plan view of a conventional prior art rectangular workpiece positioning system and cutting table.

A further advantage of the method and apparatus of the present invention is that it is easily retrofitted onto existing cutting tables, such as cutting table 10 illustrated in FIG. 1. An existing glass workpiece cutting table appropriate for retrofitting with the present system will generally have at least a conveyor, such as conveyors 14, for receiving and moving the glass workpiece in a transporting direction 12 and a cutting head assembly 22 which includes a movable cutting head for cutting glass according to a predetermined pattern. The method includes the steps of disabling any supplemental conveyors, such as retractable conveyor 20 in FIG. 1, which operate transverse or in other directions angled relative to the transporting direction. This disabling may include removal of the retractable conveyors. A stopping device is installed to abut a front edge of the glass workpiece which will be positioned substantially perpendicular to the transporting direction. The stop mechanism 56 may include a pair of retractable stop members as in FIG. 2 of the present invention. It should be noted that cutting table 10 of the prior art already includes a first pair of stops 16 such that no additional stop mechanism needs to be installed. An edge sensor, such as sensor 70, is attached to the cutting head assembly 22 for sensing a side edge of the retractable glass workpiece which is substantially parallel to the transporting direction. Additionally, the second pair of stops 18 may also be removed from the cutting table 10 since they would no longer be required in the method according to the present invention. The remaining modifications represent software changes in the controller for utilizing movement of the cutting head assembly 22 for detecting a side edge of the glass workpiece parallel to the transporting direction 52 and appropriate updating of the control of the cutting head assembly 22 during the cutting operation to account for the offset detected.

It will be appreciated by those of ordinary skill in the art that various changes and modifications may be made to the present invention without departing from the spirit and scope thereof. Consequently, the scope of the present invention is intended to be defined by the following claims.

What is claimed is:

1. A glass workpiece cutting table comprising:

a conveyor transporting and supporting a glass workpiece in a transporting direction;

a stop mechanism adapted to abut an edge of the glass workpiece which is positioned to extend substantially perpendicular to said transporting direction of said conveyor, wherein said conveyor transports the glass workpiece in said transporting direction until the glass workpiece engages said stop mechanism;

a movable electronic edge sensor adapted to sense an edge of the glass workpiece extending substantially parallel to said transporting direction without physically contacting the glass workpiece, said movabl edge sensor movable at least perpendicular to said transporting direction;

a movable cutting head for cutting of the glass workpiece according to a predetermined pattern, the predetermined pattern not limited to a profile of the glass workpiece; and a controller coupled to said edge sensor for controlling movement of said cutting head, wherein said controller is adapted to determined a position of the glass workpiece, relative to said conveyor of said cutting table based upon a sensing of an edge of the glass workpiece by said edge sensor, and wherein said controller controls movement of said cutting head relative to said conveyor of said cutting table based upon said predetermined pattern.

2. The cutting table of claim 1 further including a cutting head assembly which includes said edge sensor and said cutting head.

3. The cutting table of claim 1 wherein said stop mechanism includes a pair of retractable stops positioned in a line substantially perpendicular to said transporting direction.

4. The cutting table of claim 1 wherein said conveyor includes a plurality of substantially parallel conveyor belts adapted to receive and transport a glass workpiece in said transporting direction which is substantially parallel to said conveyor belts.

5. The cutting table of claim 1 wherein said edge sensor is a photocell.

6. A glass workpiece positioning system for positioning rectangular glass workpieces, said positioning system comprising:

a conveyor for receiving, transporting and supporting the rectangle glass workpiece in a transporting direction;

a stop mechanism adapted to abut an edge of the rectangular glass workpiece which is positioned to extend substantially perpendicular to said transporting direction of said conveyor, wherein said conveyor transports the rectangular glass workpiece in said transporting direction until the rectangular glass workpiece engages said stop mechanism;

a movable electronic edge sensor adapted to sense an edge of the rectangular glass workpiece extending substantially parallel to said transporting direction, said movable electronic edge sensor movable at least perpendicular to said transporting direction without physically contacting the glass workpiece; and a control means coupled to said edge sensor adapted to determine a position of the glass workpiece relative to said conveyor based upon a sensing of the edge of the glass workpiece by said edge sensor.

7. The positioning system of claim 6 wherein said movable edge sensor is mounted on a cutting head assembly which includes a movable cutting head for cutting the glass workpiece according to a predetermined pattern.

8. The positioning system of claim 7 wherein said stop mechanism includes a pair of retractable stops positioned in a line perpendicular to said transporting direction.

9. The positioning system of claim 8 wherein said conveyor includes a plurality of substantially parallel conveyor belts adapted to receive and transport a glass workpiece in said transporting direction which is substantially parallel to said conveyor belts.

10. The positioning system of claim 9 wherein said edge sensor is a photocell.

11. A method of positioning a glass workpiece on a cutting table comprising the steps of:

a) receiving and transporting a glass workpiece in a transporting direction;

b) abutting a first edge of said glass workpiece which is positioned substantially perpendicular to said transporting direction;

c) moving an electronic edge sensor substantially perpendicular to said transporting direction;

d) sensing an edge of said glass workpiece which is substantially parallel to said transporting direction without physically contacting the glass workpiece; and e) determining a position of the glass workpiece relative to the cutting table based on a sensing of the edge of the glass workpiece by said edge sensor, wherein determining the position of the glass workpiece is used to adjust automatic processing of the glass workpiece on the cutting table.

12. The method of claim 11 wherein said receiving and transporting of said glass workpiece are performed on a conveyor which includes a plurality of substantially parallel conveyor belts adapted to receive and transport said glass workpiece in said transporting direction which is substantially parallel to said conveyor belts.

13. The method of claim 12 wherein said abutting of said first edge of said glass workpiece utilizes a stop mechanism which includes a pair of retractable stops positioned in a line perpendicular to said direction of travel, whereby said glass workpiece is aligned with said transporting direction.

14. The method of claim 13 wherein said movable edge sensor is mounted on a cutting head assembly which includes a movable cutting head for cutting the glass workpiece according to a predetermined pattern, whereby said moving of said edge sensor includes moving of said cutting head assembly.

* * * * *

UNITED STATES PATENT AND TRADEMARK OFFICE
CERTIFICATE OF CORRECTION

PATENT NO.    : 6,202,524 B1
DATED         : March 20, 2001
INVENTOR(S)   : Dennis J. Cunningham Page 1 of 1

It is certified that error appears in the above-identified patent and that said Letters Patent is hereby corrected as shown below:

<u>Column 5,</u>
Line 31, claim 1, "movabl" should read -- movable --.
Line 63, claim 6, "rectangle" should read -- rectangular --.

Signed and Sealed this

Sixteenth Day of October, 2001

Attest:

NICHOLAS P. GODICI
Attesting Officer    Acting Director of the United States Patent and Trademark Office

UNITED STATES PATENT AND TRADEMARK OFFICE
CERTIFICATE OF CORRECTION

PATENT NO. : 6,202,524 B1
DATED : March 20, 2001
INVENTOR(S) : Dennis J. Cunningham Page 1 of 1

It is certified that error appears in the above-identified patent and that said Letters Patent is hereby corrected as shown below:

<u>Column 5, claim 1,</u>
Line 31, "movabl" should read -- movable --.

<u>Column 5, claim 6,</u>
Line 64, "rectangle" should read -- rectangular --.

Signed and Sealed this

Twenty-second Day of January, 2002

Attest:

JAMES E. ROGAN
*Attesting Officer*  *Director of the United States Patent and Trademark Office*